United States Patent Office 2,807,752
Patented Sept. 24, 1957

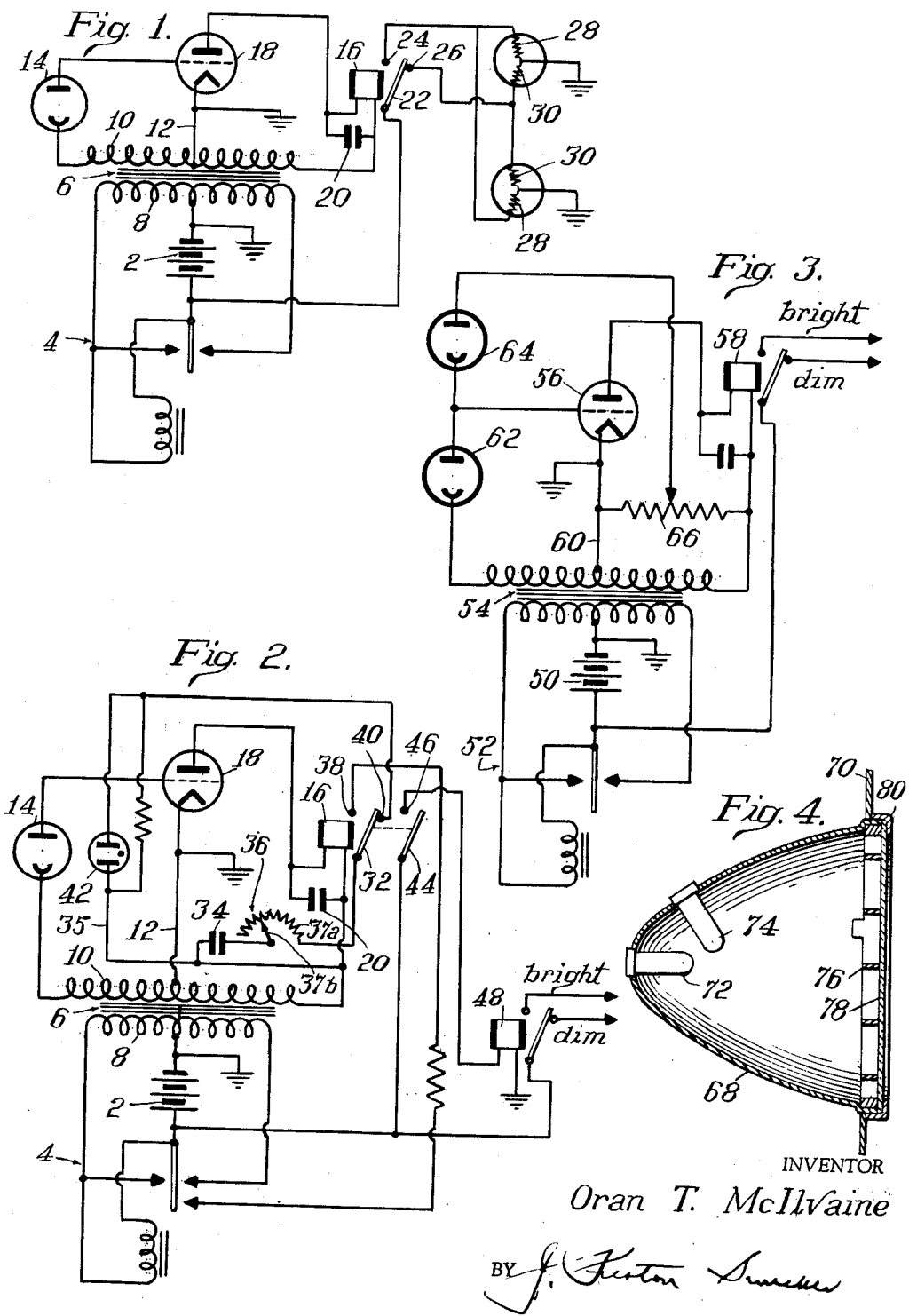

2,807,752
AUTOMATIC HEADLIGHT CONTROL APPARATUS

Oran T. McIlvaine, Geneva, Ill.

Application August 24, 1954, Serial No. 451,843

21 Claims. (Cl. 315—83)

This invention relates to automatic headlight control apparatus for automatically dimming the headlights of a vehicle upon the approach of a lighted vehicle from the opposite direction.

The practical advantages of automatically controlling the dimming of automobile headlights are so obvious that much work has been done in attempts to provide practical apparatus for this purpose. However, the apparatus in use heretofore has been complex and subject to certain objections, and it is the principal object of this invention to obviate these objections and to simplify and improve such apparatus.

In attempting to make apparatus having the sensitivity necessary for successful operation, many prior workers have proposed electrical circuits of great complexity. These complex electrical systems are expensive to manufacture, and their life expectancies are rather short. The greater the number of elements employed in the system, the greater is the likelihood of failure.

This objection is obviated in the present invention by providing a control system composed of a minimum number of conventional circuit elements.

Another difficulty with the prior art dimmers was their failure to take into account variations in battery voltage. The voltages of batteries in different automobiles may vary widely, and the voltage of a given battery may change from time to time. Unless means are provided to assure balance of the electrical system in spite of these wide variations in battery voltage, the control effect will not be uniform.

The present invention meets this demand by the arrangement of a light-sensitive element and a control relay in a control circuit so that the control effect produced by the light-sensitive element is proportional to the potential applied to the relay. With such an arrangement, the control effect produced by the light-sensitive element increases in magnitude automatically whenever the need for the control effect increases due to an increase in relay potential, as would occur upon an increase in battery voltage. It will be apparent that this aspect of the invention is of great significance with respect to the standardization of dimming apparatus to be applied to various automobiles.

Dimming equipment in use heretofore also failed to take into account the effect of ambient light upon the control system. Consider, for example, the differences in the operation of the equipment at dusk and at night. It is likely that the light intensity at dusk would be high enough to cause actuation of a control circuit sensitive enough to respond properly to the incidence of headilghts from approaching vehicles at night. If such were the case, it would not be possible to use the automatic dimming equipment during this period of the day without sacrificing entirely the use of the bright lights.

Even if the intensity of the ambient light at dusk were not sufficient to cause dimming of the headlights, the amount of additional light necessary to accomplish this result would be much less than it would be on a dark night. This would mean that the dimming of the headlights would take place when the approaching vehicle was very far away, or that the dimming of the headlights might occur upon the incidence of light from such extraneous sources as street lights and road signs.

These variations in ambient light intensity are allowed for in the automatic dimming apparatus of this invention by using two light-sensitive elements instead of the usual one. One of these light-sensitive elements is mounted to receive light from the headlights of vehicles approaching from the opposite direction. The second light-sensitive element, however, is so positioned on the vehicle that it will receive ambient light but will not receive light from the headlights of an approaching vehicle. The electrical system is arranged so that the signals from these two light-sensitive elements will be combined, with the signal from the second light-sensitive element blocking out a portion of the signal from the first light-sensitive element. Means may be provided, if desired, for adjusting the magnitude of the signal from the second light-sensitive element independently of the magnitude of the signal from the first light-sensitive element. If such means is provided, it is possible to select the level of illumination around which the system will operate automatically.

Another feature of this invention tending to minimize the effect upon the operation of the equipment of light from sources other than the lights of approaching vehicles is the utilization of a detector which is sensitive only to light waves in the infra red range. This may include a filter positioned in front of a conventional light-sensitive element to prevent light of wave lengths outside the infra red range from hitting the light-sensitive element. Since about ninety percent of the light emitted by automobile headlights is infra red, the filter has little effect on light coming from headilghts, and the sensitivity of the unit is not adversely affected. Light from many other sources, however, may be expected to have large components of light which would be blocked by the filter. In this manner, the effectiveness of light from extraneous sources is reduced.

The filter also serves to narrow the difference in intensities between headilghts and tail lights. It is then possible for the dimmer to operate in response both to the headlights of vehicles approaching from the opposite direction and to the tail lights of vehicles being overtaken. Of course, the vehicles have to be close together to make a tail light an effective light source, but this is obviously desirable.

Still another feature of this invention is the provision of novel delay means in the control system to hold the headlights in the dim condition without regard to the amount of light striking the light-sensitive element for a time interval beginning immediately after they are switched from bright to dim. The duration of the delay may be fixed, but preferably, it is automatically varied in accordance with the speed of approach of the vehicles.

This delay means may include a lamp located adjacent the light-sensitive element of the control circuit and arranged to be energized during the period required for the charge to leak off a condenser, through a variable resistor and the lamp. When the headlights are on bright, the condenser is charged, and then, the switching of the headlights to dim is accompanied by the connection of the charged condenser to the lamp. The variable resistor may be connected to the speedometer of the vehicle so that the period required for the condenser to discharge will vary inversely as the speed of the vehicle.

The charging of the condenser in the delay system preferably is accomplished without using a rectifier so that the extreme simplicity and ruggedness of the control unit may be preserved. One side of the condenser may be connected to an end of the transformer secondary winding supplying high voltage for the operation of the unit, and the other side of the condenser may be connected to a stationary contact in position to be engaged by the reed of the vibrator supplying alternating current to the primary winding of the transformer.

Other advantages of this invention will become apparent from a consideration of the following detailed description taken in connection with the accompanying drawings in which:

Fig. 1 is a wiring diagram showing a very simple circuit for controlling the dimming of headlights;

Fig. 2 is a wiring diagram showing a control circuit similar to that shown in Fig. 1, but having in addition thereto, means for preventing the return of the headlights from dim to bright for a variable time interval after the shifting of the headlights from bright to dim;

Fig. 3 is a wiring diagram illustrating an embodiment of the invention in which two light-sensitive elements are employed to automatically correct for variations in ambient light intensity; and Fig. 4 is an axial sectional view of a detector according to this invention.

The embodiment of the invention illustrated diagrammatically in the wiring diagram of Fig. 1 includes a conventional automobile battery 2, the voltage of which need not be a particular amount and may be anywhere from say three to eight volts. The batteries of different automobiles will have different voltages, and the voltage of the same battery will change over long periods of time.

The battery 2 is connected to a conventional vibrator designated generally by the numeral 4. This vibrator is of the type usually employed in automobile radio circuits to supply the necessary potential for operation of the radio tubes. The vibrator 4 is connected to a transformer 6 having a primary winding 8 and a secondary winding 10. The secondary winding supplies the electromotive force as alternating current for the operation of the control circuit of the system. It includes a center tap 12 connected to the ground as shown, and it may be wound to provide as much as from 100 to 200 volts on either side of ground.

A light-sensitive element 14 is connected to one end of the secondary winding 10 of the transformer 6. The light-sensitive element 14 of the illustrated circuit may be of the photoconductive type, of which lead sulfide and cadmium selenide cells are familiar examples. However, it will be apparent to persons skilled in the art that the circuit may be modified to use photo-electric tubes or light-sensitive elements of other types.

Connected to the other end of the secondary winding 10 is a relay 16. This relay is connected also to the plate or anode of an electronic tube 18 of conventional construction. The grid of the tube 18 is connected to the light-sensitive element 14, and its cathode is connected to the center tap 12. This tube 18 may be of the usual triode or pentode, or any gas type of either hot or cold cathode type.

Since alternating current is employed in the control circuit, a condenser 20 should be connected in parallel with the coil of the relay 16 to eliminate chattering of this relay.

In Fig. 1, the relay 16 controls the opening and closing of the bright and dim circuits of the automobile headlights directly. Its movable contact member 22 is normally being spring-biased in open position in engagement with the contact 26, when the relay 16 is deenergized. The movable contact member 22 is connected to the battery 2, and is arranged to engage alternately fixed contacts 24 and 26 in the bright and dim circuits. The bright filaments of the headlights are indicated at 28, and the dim filaments at 30.

In operation, the grid of the tube 18 will remain substantially at ground potential as long as no light is falling on the light-sensitive element 14. With the grid at approximately ground potential, the tube will become conductive each time the plate potential becomes positive, and the relay 16 will be energized to cause the closing of the contacts 22 and 24. Closure of these contacts 22 and 24 results in the energization of the bright filaments 28 of the headlights.

When light from the headlights of an approaching vehicle falls on the light-sensitive element 14, it will become conductive so as to complete the grid circuit of the tube 18. The grid potential will now become negative when the plate potential is positive, and the passage of electrons from the cathode to the plate will be prevented. Deenergization of the relay 16 and closure of the dim circuit will result.

The connection of the cathode to the center tap 12 of the secondary winding 10 allows half of the voltage developed in the secondary winding for the plate circuit and the other half for the grid circuit of the tube. This feature is of considerable importance because it enables the circuit to correct automatically for variations in the battery voltage. Assume, for example, that the control circuit is energized by a battery having an unusually high voltage. In such a case, the plate potential will be much higher than the potential for which the circuit is designed. With a higher plate potential, the control effect that must be exercised by the grid in order to prevent the tube from becoming conductive will be greater. This greater control effect is achieved automatically according to the present invention, because the increase in plate potential is accompanied by an exactly equal increase in the potential applied to the grid. Thus, when the light-sensitive element becomes conductive, the grid potential will swing negative in an amount proportional to the positive potential of the plate so as to retain effective control of the operation of the tube 18.

Since the circuit illustrated in Fig. 1 automatically takes into account variations in battery voltage, there is no need for the inclusion of adjusting means therein. The device, consequently, is suitable for operation by the general public without requiring any operation of controls.

The circuit illustrated in Fig. 1 may be used satisfactorily in certain areas, where level, straight roads are the rule, or in a simple inexpensive construction. However, a dimmer suitable for general use should have suitable time delay means for holding the headlights on dim for a predetermined time interval after the initial switching of the headlights from bright to dim. This prevents flashing of the headlights due to momentary removal from the light-sensitive element of light emanating from the approaching vehicle. Such momentary removal might result from a number of situations, examples of which are the effects produced by travelling over hills and around curves, and the effects produced by the dimming of the headlights on the oncoming vehicles. The need for such delay means and a practical dimmer system employing such delay means are fully disclosed in my prior application, Serial No. 424,656, filed April 21, 1954.

Fig. 2 illustrates the application to the basic circuit of Fig. 1 of a time delay similar in some respects to that disclosed in my prior application just mentioned. Since the basic circuit, generally, is the same as that already described, the reference numerals applied in Fig. 1 will also be employed in Fig. 2 for comparable parts.

The control relay 16 in Fig. 2 has a movable contact member 32 associated therewith which is connected to a condenser 34 through a suitable resistor 36. The other terminal of the condenser 34 is connected through the lead 35 to the same end of the transformer winding 10 that is connected to the plate of the tube 18. Contact member 32 is normally held in engagement with a fixed contact element 38, when the relay 16 is energized, connected as shown to the vibrator 4. As a consequence, the condenser 34 acquires a charge directly from the transformer and vibrator during the period when the headlights are on bright. When the relay 16 releases the contact member 32 to switch the headlights from bright to dim, the contact 32 moves into engagement with another fixed contact 40 connetcted to a lamp 42. The lamp 42 is preferably a neon tube or other suitable gas-filled lamp, and is connected at one side to the relay end of the winding 10 through the lead 35, as shown. With the contacts 32 and 40 in engagement, the charge on the condenser 34 leaks off through the resistor 36 and the neon tube 42, lighting the tube for the interval required for the condenser 34 to become discharged.

The lamp 42 is positioned on the vehicle so that its light falls upon the light-sensitive element 14. Consequently, so long as the lamp 42 remains energized, the light-sensitive element 14 will retain control of the control circuit, and energization of the relay 16 will be prevented. The interval during which the lamp 42 will remain illuminated can be set at any desired value by giving proper magnitudes to the capacitance and resistance of the condenser 34 and of the resistor 36, respectively. This interval will normally be of from three to fifteen seconds' duration.

In applications where desired, it is advantageous to provide means for automatically varying the delay interval in response to the speed of the automobile. In this way, the delay interval is made to correspond more nearly to the actual demands of the situation. If the car is moving rapidly toward the approaching car, the delay interval necessary for the proper operation of the automatic dimming equipment is obviously less than it would be if the cars were approaching each other less rapidly. Unless some means for taking this feature into account automatically is provided, it is necessary to use some predetermined average period for the delay interval. When such average period is used and the cars are approaching each other quite rapidly, it is possible that the cars will have already passed each other before the expiration of the delay period. This would be undesirable because the driver would not have the benefit of his bright lights during the very time when they are most needed, that is during the interval in which his eyes are readjusting after the passage of the other automobile.

One satisfactory arrangement for accomplishing automatic control of the delay interval in response to the speed of the vehicle is indicated diagrammatically in Fig. 2. The resistor 36 is shown as comprising an arcuate element 37a and a movable contact element 37b. The movable contact element 37b may be connected for movement with the needle or cable of the vehicle speedometer so that as the car moves faster, it swings clockwise in Fig. 2. Clockwise movement of this movable member 37b reduces the effective length of the arcuate element 37a to reduce the resistance offered thereby. Reduction of the resistance of this element allows the charge to leak off the condenser 34 at a more rapid rate, so that the period during which the tube 42 will be illuminated is shortened.

This same effect can be accomplished in different ways, as will be obvious. One advantageous arrangement would be a modification of the circuit of the light-sensitive element 14, or a modification of the plate circuit of the tube 18, to cause the operation of the circuit to occur in response to the rate of increase in the amount of light falling on the light-sensitive element. The rate by which the light increases would control the delay interval, that is, the faster the light increases, the shorter would be the delay.

Another satisfactory arrangement for controlling the delay interval is to substitute for the resistor 36 a second photocell or other light responsive device, arranged to pick up oncoming light from the approaching vehicle. This second photocell may be arranged in the same reflector, or otherwise mounted, but not necessarily subject to direct light. It would be connected in the circuit of the condenser so as to discharge the latter at an increased rate as the light builds up or increases on this second photocell as the vehicles approach more closely. This provides a very simple way of discharging the condenser as the vehicles are passing and thereby providing the needed time delay to assure of maintenance on dim during passing and immediately after the vehicles pass each other, the headlights are restored on bright.

Fig. 2 also shows a variation of the invention in which the control relay 16 does not directly control the bright and dim circuits of the headlights. In this embodiment of the invention, the control relay 16 has a movable contact element 44 which normally engages a fixed contact 46 in the energizing circuit for a power relay 48. As long as the control relay 16 remains energized, the power relay 48 will be energized from its connections with the battery 2 and ground. The contacts associated with the power relay 48 correspond in function to the contacts on the relay 16 of Fig. 1 to control the energization of the bright and dim circuits. No further description of this arrangement appears to be necessary.

Fig. 3 illustrates another embodiment of the invention which is similar in some respects to that illustrated in Fig. 1. It includes a battery 50, a conventional vibrator 52 and vibrator transformer 54, a conventional electronic tube 56 and a conventional relay 58. These elements are the same as the corresponding elements of the embodiment illustrated diagrammatically in Fig. 1 as described above. However, the grid circuit for the tube 56 is different from the grid circuit for the tube 18.

The grid circuit for the tube 56 of Fig. 3 includes a first light-sensitive element 62 connected to one end of the secondary winding of the transformer 54, and a second light-sensitive element 64 connected through a potentiometer 66 with the cathode of the tube 56 and the high voltage end of the transformer.

The first light-sensitive element 62 is positioned on the vehicle in a manner comparable in all respects to the positioning of the light-sensitive element 14 in Fig. 1. Its function is to receive light emanating from the headlights of an approaching vehicle and to exert control effects in response to the reception of such light. The second light-sensitive element 64, however, is positioned on the vehicle so that it will not receive light from oncoming vehicles. Its function is to detect the general illumination level prevailing in the area. By illumination level is meant the amount of ambient light such as the light from the sky at dusk. It should be noted that the first light-sensitive element is also subject to the reception of this ambient light as a matter of necessity. It cannot receive light from oncoming vehicles without also receiving ambient light waves.

The connection of both of the light-sensitive elements 62 and 64 in the grid circuit of the electronic tube 56, in the manner illustrated, causes the effective signal on the grid to be the difference between the signals from the two light-sensitive elements. When the signals from the two light-sensitive elements are equal, they will cancel out each other.

The practical effect achieved by the circuit illustrated in Fig. 3 of the drawings is to make the dimming equipment available for use without adjustment at times other than periods of extreme darkness. The operation of the dimmer will be the same on a dark night, on a moonlit night and at dusk or dawn.

It will be understood that this effect can be produced by other circuits also, such as by a control in the cathode circuit or by grid bias control.

Control over the potential applied to the light-sensitive element 64 is retained by the provision of the potentiometer 66 connected across that portion of the secondary winding of the transformer 54 which is in the plate circuit of the tube 56. By adjusting the movable contact element of the potentiometer 66, it is possible to vary the potential to which the light-sensitive element 64 is subjected without altering the potential applied to the light-sensitive element 62. Thus, the magnitude of the signal from the light-sensitive element 64 may be greater or less than the magnitude of that portion of the signal from the light-sensitive element 62 attributable to the incidence of ambient light thereon.

This control regulates the general level of illumination around which the dimming equipment will operate automatically. For example, if it is desired to have the car lights on dim while driving through a town, the level could be set so that this will take place. On the other hand, if it were desired to have the automatic operation continue in the same way as on the open road, this also could be brought about by suitable adjustment of the potentiometer 66.

The delay circuit has been omitted from Fig. 3 in the interest of simplicity, but it is preferred that some time delay means be used also in this embodiment of the invention. The connections may be the same as illustrated in Fig. 2. The lamp 42 would be arranged, of course, to illuminate the light-sensitive element 62 and would be shielded from the light-sensitive element 64.

Fig. 3 also indicates that the bright and dim circuits of the headlights are controlled directly from the control relay 58. This is not essential, however, and a power relay such as the relay 48 of Fig. 2 may be employed.

The light-sensitive element 14 or 62 may be mounted anywhere on the vehicle where it will receive light emanating from the headlights of an approaching vehicle. The unit of the present invention is very compact structurally and will not detract from the general appearance of the automobile.

Light collecting means may be associated with the light-sensitive element, preferably in the manner disclosed in my copending application, Serial No. 424,656, filed April 21, 1954. Such a construction is illustrated in Fig. 4 of the drawings. A parabolic reflector 68 is suitably attached to the body 70 of the vehicle and carries at its focal point the light-sensitive element 72. This light-sensitive element corresponds to the element 14 in Figs. 1 and 2, and to the element 62 in Fig. 3. A lamp 74, corresponding to the element 42 in Fig. 2, is also located in the reflector 68. A louver panel 76 and a transparent plate 78 are positioned adjacent the front end portion of the reflector and are held thereon by a snap ring 80.

As described in the copending application, the reflector 68 serves to gather the light rays emanating from the headlights of approaching vehicles and focus them upon the light-sensitive element 72. The louver panel serves to restrict the angle from which light rays may enter the reflector 68. In this way, the louver panel accomplishes the very important result of excluding light emanating from many of the extraneous sources normally encountered in driving along a highway.

According to the present invention, the transparent plate 78 is to be a filter formed of material that is transparent only to infra red light rays. Light waves of other wave lengths will not be transmitted by the plate 78. Since approximately 90% of the light from automobile headlights is in the infra red range, very little of this light will be excluded by the transparent plate 78.

Light from other sources, such as from the sky at dusk, or from road signs, may be expected to have a much larger proportion of light waves of lengths outside of the infra red range. Light from such sources will, therefore, be prevented to a large extent from entering the reflector 68, and the dimming apparatus will be less subject to accidental operation from these extraneous light sources than if the filter 78 were not employed.

The restriction upon the wave length of light entering the reflector 68 has still another advantage in that it helps to eliminate the difference in light intensity between light from tail lights and light from headlights. The result is that the dimming equipment may be set to operate effectively in response to the headlights of approaching vehicles, and with the same setting, it will be effective to dim the headlights as the automobile approaches closely another automobile travelling in the same direction. In the latter case, the dimming equipment will be actuated by the tail light of the vehicle ahead.

Although I have described in detail several embodiments of my invention, variations will be apparent to persons skilled in the art, and it is intended that the scope of the invention be ascertained from the following claims.

I claim:

1. Apparatus for use with a vehicle headlight having a dim circuit and a bright circuit, comprising a transformer having a primary winding and a secondary winding, an electronic tube including an anode, a cathode and a grid, a light-sensitive element adapted to be positioned on the vehicle so as to receive light from another vehicle, controlling means for the bright and dim circuits, a circuit connecting the secondary winding at one end with one side of the light-sensitive element, a circuit connecting the opposite side of the light-sensitive element with the grid, a circuit connecting the controlling means with the anode and the opposite end of the secondary winding, and a circuit connecting the cathode with the secondary winding intermediate the length thereof.

2. Apparatus for use with a vehicle headlight having a dim circuit and a bright circuit, comprising a transformer having a primary winding and a secondary winding, an electronic tube including an anode, a cathode and a grid, a light-sensitive element adapted to be positioned on the vehicle so as to receive light from another vehicle, a relay for controlling the bright and dim circuits, a circuit connecting one end of the secondary winding with one side of the light-sensitive element, a circuit conencting the opposite side of the light-sensitive element with the grid, a circuit connecting the relay in series with the anode and opposite end of the secondary winding, and ac ircuit connecting the cathode directly with the secondary winding approximately at the mid portion thereof.

3. Apparatus for use with a vehicle headlight having a dim circuit and a bright circuit, comprising a battery, a vibrator connected to said battery, a transformer having its primary winding connected to said vibrator, an electronic tube including a cathode, an anode, and a grid, a light-sensitive element connected between the grid of said tube and one end portion of the secondary winding of said transformer and adapted to be positioned on said vehicle so as to receive light from the headlights of vehicles approaching from the opposite direction, a relay having a coil connected between the anode of said tube and the opposite end portion of the secondary winding of said transformer, said relay also having switch means for selectively controlling the energization of said bright and dim circuits in response to energization and deenergization of said relay coil, and means connecting the cathode of said tube to the central portion of the secondary winding of said transformer, whereby said light-sensitive means automatically maintains control over the energization of said relay coil for a substantial range of battery voltages.

4. Apparatus for use with a vehicle headlight having a dim circuit and a bright circuit, comprising a battery, a vibrator connected to said battery, a transformer having its primary winding connected to said vibrator, an electronic tube including a cathode, an anode, and a grid, a light-sensitive element whose conductivity increases with the amount of light falling thereon connected between the grid of said tube and one end portion of the secondary winding of said transformer and adapted to be positioned on said vehicle so as to receive light from the headlights of vehicles approaching from the opposite direction, a relay having a coil connected between the anode of said tube and the opposite end portion of the secondary winding of said transformer, said relay also having switch means for selectively controlling the energization of said bright and dim circuits in response to energization and deenergization of said relay coil, and means forming a direct connecting circuit from the cathode of said tube to the central portion of the secondary winding of said transformer, whereby said light-sensitive means automatically maintains control over the energization of said relay coil for a substantial range of battery voltages.

5. A device for use with a vehicle headlight having a dim circuit and a bright circuit, comprising a light-sensitive element for causing said bright circuit to be deenergized and said dim circuit to be energized upon the approach of a lighted vehicle, means effective during a time interval beginning soon after the incidence of light from the approaching vehicle on said light-sensitive element to prevent any change in the condition of the bright and dim circuits, and means controlling the length of said time interval in response to the rate of approach of the two vehicles, decreasing the length of said interval as said rate increases and increasing the length of said interval as said rate decreases.

6. A device for use with a vehicle headlight having a dim filament and a bright filament, comprising a light-sensitive element for causing said bright filament to be deenergized and said dim filament to be energized upon the approach of a lighted vehicle from the opposite direction, means effective during a time interval beginning soon after the incidence of light from the approaching vehicle on said light-sensitive element to prevent any change in the condition of the circuits for the bright and dim filaments, and means controlling the length of said time interval in response to the speed of the vehicle, decreasing the length of said interval as the vehicle speed increases and increasing the length of said interval as the vehicle speed decreases.

7. Automatic dimming apparatus for use with a vehicle provided with a speedometer and a headlight having a dim circuit and a bright circuit, comprising a relay for alternately closing said circuits, a light-sensitive element adapted to be positioned on said vehicle so as to receive light from the headlights of vehicles approaching from the opposite direction, means operatively connecting said light-sensitive element to said relay, and delay means arranged to control the condition of said relay for a time interval of a length depending upon the speed of the vehicle to prevent the closing of the bright circuit during said interval, said delay means including a control element adapted when energized to control said relay, a condenser, means for charging said condenser before said interval, a variable resistance element adapted to be connected to said speedometer so that its resistance decreases as the speed of the vehicle increases, and means for connecting said condenser to said control element through said resistance element to start said delay interval, whereby said control element will be energized by the discharging of said condenser through said resistance element.

8. In a vehicle headlight control system, the combination of a battery, a vibrator, a transformer having a primary winding connected to said vibrator, a dim circuit, a bright circuit, a relay for alternately closing said circuits, a light-sensitive element connected to the secondary winding of said transformer and being adapted to be positioned on said vehicle so as to receive light from the headlights of vehicles approaching from the opposite direction, means operatively connecting said light-sensitive element to said relay, and delay means arranged to control the condition of said relay for a time interval beginning with the opening of said bright circuit so as to prevent the closing of said bright circuit during said interval, said delay means including a control element adapted when energized to control said relay, a condenser, and means effective when said bright circuit is closed to complete a condenser charging circuit from the secondary winding of said transformer to said vibrator and effective when said bright circuit is opened to open said condenser charging circuit and connect said condenser to said control element.

9. Apparatus for use with a vehicle headlight having a dim circuit and a bright circuit, comprising means for alternately closing and opening said dim and bright circuits and a control circuit for said means, said control circuit including a first light-sensitive element adapted to be positioned on said vehicle so as to receive light from the headlights of vehicles approaching from the opposite direction, and a second light-sensitive element adapted to be positioned on said vehicle so as to permit reception of ambient light but prevent reception of light from the headlights of vehicles approaching from the opposite direction, a source of alternating current connected with said first and second light-sensitive elements, said light-sensitive elements being arranged in said control circuit so that the signal from said second light-sensitive element blocks out a portion of the signal from said first light-sensitive element.

10. Apparatus for use with a vehicle headlight having a dim circuit and a bright circuit, comprising means for alternating closing and opening said dim and bright circuits and a control circuit for said means, said control circuit including a first light-sensitive element adapted to be positioned on said vehicle so as to receive light from the headlights of vehicles approaching from the opposite direction and a second light-sensitive element adapted to be positioned on said vehicle so as to permit reception of ambient light but prevent reception of light from the headlights of vehicles approaching from the opposite direction, a source of alternating current connected with said first and second light-sensitive elements, said light-senstive elements being arranged in said control circuit so that the signal from said second light-sensitive element blocks out that portion of the signal from said first light-sensitive element due to the incidence of ambient light upon such element.

11. Apparatus for use with a vehicle headlight having a dim circuit and a bright circuit, comprising means for alternately closing and opening said dim and bright circuits and a control circuit for said means, said control circuit including a first light-sensitive element adapted to be positioned on said vehicle so as to receive light from the headlights of vehicles approaching from the opposite direction, a second light-sensitive element adapted to be positioned on said vehicle so as to permit reception of ambient light but prevent reception of light from the headlights of vehicles approaching from the opposite direction, a source of alternating current connected with said first and second light-sensitive elements, said light-sensitive elements being arranged in said control circuit so that the signal from said second light-sensitive element blocks out a portion of the signal from said first light-sensitive element, and means for varying the relationship between the magnitudes of the signal from said second element and of said portion of the signal from said first element.

12. Apparatus for use with a vehicle headlight having a dim circuit and a bright circuit, comprising means for alternately closing and opening said dim and bright circuits and a control circuit for said means, said control circuit including a first light-sensitive element adapted to be positioned on said vehicle so as to receive light from the headlights of vehicles approaching from the opposite direction, a second light-sensitive element adapted to be positioned on said vehicle so as to permit reception of ambient light but prevent reception of light from the headlights of vehicles approaching from the opposite direction, a source of alternating current connected with said first and second light-sensitive elements, said light-sensitive elements being arranged in said control circuit so that the signal from said second light-sensitive element blocks out a portion of the signal from said first light-sensitive element, and means for changing the magnitude of the signal from said second light-sensitive element without affecting the magnitude of the signal from said first light-sensitive element.

13. In combination, a vehicle, a headlight having a dim circuit and a bright circuit, a battery, a vibrator connected to said battery, a transformer having its primary winding connected to said vibrator, an electronic tube including an anode, a cathode, and a grid, a first light-sensitive element on said vehicle in position to receive light from the headlights of vehicles approaching from the opposite direction and being connected between the grid of said tube and one end portion of the secondary winding of said transformer, a second light-sensitive element on said vehicle in position to receive ambient light but out of position for the reception of light from approaching vehicles, a source of alternating current connected with said first and second light-sensitive elements, means for connecting said second light-sensitive element between said grid and the opposite end portion of the secondary winding of said transformer so that the signal therefrom neutralizes a portion of the signal from said first light-sensitive means, a relay having a coil connected between the anode of said tube and said opposite end portion of the secondary winding of said transformer, said relay also having switch means for selectively controlling the energization of said bright and dim circuits in response to energization and deenergization of said relay coil, and means connecting the cathode of said tube to the central portion of the secondary winding of said transformer, whereby said first light-sensitive means automatically maintains control over the energization of said relay coil for a substantial range of battery voltages and ambient light intensities.

14. In combination, a vehicle, a headlight having a dim circuit and a bright circuit, a battery, a vibrator connected to said battery, a transformer having its primary winding connected to said vibrator, an electronic tube including an anode, a cathode, and a grid, a first light-sensitive element on said vehicle in position to receive light from the headlights of vehicles approaching from the opposite direction and being connected between the grid of said tube and one end portion of the secondary winding of said transformer, a second light-sensitive element on said vehicle in position to receive ambient light but out of position for the reception of light from approaching vehicles, a source of alternating current connected with said first and second light-senstive elements, means including an adjustable resistance element for connecting said second light-sensitive element between said grid and the opposite end portion of the secondary winding of said transformer so that the signal therefrom neutralizes a controllable portion of the signal from said first light-sensitive means, a relay having a coil connected between the anode of said tube and said opposite end portion of the secondary winding of said transformer, said relay also having switch means for selectively controlling the energization of said bright and dim circuits in response to energization and deenergization of said relay coil, and means connecting the cathode of said tube to the central portion of the secondary winding of said transformer, whereby said first light-sensitive means automatically maintains control over the energization of said relay coil for a substantial range of battery voltages and ambient light intensities.

15. Apparatus for automatically dimming a vehicle headlight upon the approach of the vehicle to either the rear or the front of another lighted vehicle, comprising a light-sensitive element adapted when actuated to dim said headlight, and a filter mounted in front of said light-sensitive element to restrict the light striking said element to light of a wave length in the infra red range to minimize the effect on said light-sensitive element of light from extraneous sources and to permit the actuation of said light-sensitive element in response to light received from either the headlights of vehicles approaching from the opposite direction or the tail lights of vehicles being overtaken.

16. Apparatus for automatically dimming a vehicle headlight upon the approach of another vehicle, comprising light-sensitive means, a concave reflector for collecting light from the other vehicle and focusing it upon said light-sensitive element, and a filter mounted forwardly of said reflector to prevent the entrance into said reflector of light of wave lengths out of the infra red range.

17. Apparatus for automatically dimming a vehicle headlight upon the approach of another vehicle, comprising light-sensitive means, a concave reflector for collecting light from the other vehicle and focusing it upon said light-sensitive element, a filter mounted forwardly of said reflector to prevent the entrance into said reflector of light of wave lengths out of the infra red range, and a louver panel also mounted forwardly of said reflector to prevent the entrance into said reflector of light from a source disposed at a large angle with respect to the direction of travel of the vehicle.

18. In an automatic vehicle headlight control system, the combination of a dim circuit, a bright circuit, a switch having contact means movable to and from positions alternately closing said circuits, a light-sensitive device responsive only to infra red light, and means operatively connecting said light-sensitive device and said switch contact means so as to cause the opening of said bright circuit and the closing of said dim circuit when infra red light falls on said light-sensitive device.

19. In a headlight dimmer circuit for a first automotive vehicle having headlights with upper and lower beams, a vibrator power supply energizable from a direct current source, a transformer connected to be energizable from said vibrator, a secondary on said transformer having first and second end terminals and an intermediate terminal, an amplifier tube having an anode, a control grid, and a cathode, a headlight control relay having an operating coil, means for connecting said operating coil between said anode and said first end terminal, means for connecting said cathode to said intermediate terminal, a main photocell connected between said control grid and said second end terminal, said photocell and said amplifier tube being so connected that under dark conditions said amplifier tube passes sufficient anode-cathode current to energize said relay operating coil to energize the upper headlight beam of the first vehicle, rectifier means operable from said vibrator power supply, normally open and normally closed double-throw contacts operable by said headlight control relay, a time delay condenser, means for establishing a charging circuit for said time delay condenser from said rectifier means through the normally open contacts of said headlight control relay, a time delay lamp, means for establishing a time delay condenser discharging circuit through said time delay lamp and the normally closed contacts of said headlight control relay, means for establishing said time delay lamp in light exchange relationship with said main photocell, whereby under dark conditions the headlight control relay is energized to charge said time delay condenser through said normally open contacts and upon incidence of light upon said main photocell from the upper headlight beam of an oncoming vehicle, sufficient to cause de-actuation of said headlight control relay, said headlight control normally closed contacts establishing said aforementioned discharge circuit to energize said time delay lamp and thus illuminate said main photocell for a predetermined time delay period to thus maintain said relay de-energized for said predetermined time delay period even though the headlight beam of said oncoming vehicle should be changed from upper to lower beam.

20. In a headlight dimmer circuit for a first automotive vehicle having headlights with upper and lower beams, a vibrator power supply energizable from a direct current source, a transformer connected to be energizable from said vibrator, a secondary on said transformer having first and second end terminals and an intermediate terminal, an amplifier tube having an anode, a control grid, and a cathode, a headlight control relay having an operating coil, means for connecting said operating coil between said anode and said first end terminal, means for connecting said cathode to said intermediate terminal, photo-sensitive means connected between said control grid and said second end terminal, said photo-sensitive means and said amplifier tube being so connected that under dark conditions said amplifier tube passes sufficient anode-cathode current to energize said relay operating coil to energize the upper headlight beam of the first vehicle, rectifier means operable from said vibrator power supply, normally open and normally closed double-throw contacts operable by said headlight control relay, a time delay condenser, means for establishing a charging circuit for said time delay condenser from said rectifier means through the normally open contacts of said headlight control relay, a time delay lamp, means for establishing a time delay condenser discharging circuit through said time delay lamp and the normally closed contacts of said headlight control relay, means for establishing said time delay lamp in light exchange relationship with said main photo-sensitive means, whereby under dark conditions the headlight control relay is energized to charge said time delay condenser through said normally open contacts and upon incidence of light upon said main photo-sensitive means from the upper headlight beam of an oncoming vehicle, sufficient to cause de-actuation of said headlight control relay, said headlight control normally closed contacts establishing said aforementioned discharge circuit to energize said time delay lamp and thus illuminate said main photo-sensitive means for a predetermined time delay period to thus maintain said relay de-energized for said predetermined time delay period even though the headlight beam of said oncoming vehicle should be changed from upper to lower beam.

21. Apparatus for use with a vehicle headlight having a dim circuit and a bright circuit, comprising a battery, a vibrator connected to said battery, a transformer having its primary winding connected to said vibrator, an electronic amplifier comprising an input circuit and an output circuit, said output circuit including electronic tube elements comprising a cathode, and an anode, a light-sensitive element connected between the input circuit of said amplifier and one end portion of the secondary winding of said transformer and adapted to be positioned on said vehicle so as to receive light from the headlights of vehicles approaching from the opposite direction, a relay having a coil connected between the output circuit of said amplifier and the opposite end portion of the secondary winding of said transformer, said relay also having switch means for selectively controlling the energization of said bright and dim circuits in response to energization and deenergization of said relay coil, and means connecting the cathode in the output circuit of the amplifier to the central portion of the secondary winding of said transformer, whereby said light-sensitive means automatically maintains control over the energization of said relay coil for a substantial range of battery voltages.

References Cited in the file of this patent

UNITED STATES PATENTS

| | | |
|---|---|---|
| 2,182,987 | Hopkins | Dec. 12, 1939 |
| 2,240,843 | Gillespie | May 6, 1941 |
| 2,423,278 | Willis | July 1, 1947 |
| 2,615,079 | Pardue et al. | Oct. 21, 1952 |